United States Patent [19]

Pellegrin et al.

[11] Patent Number: 4,596,603

[45] Date of Patent: Jun. 24, 1986

[54] METHOD FOR THE SELECTIVE RECOVERY OF CONSTITUENT MATERIALS FROM INSULATED-ELECTRICAL-CABLE WASTES

[75] Inventors: Roberto Pellegrin; Alessandro Ghisotti, both of Turin, Italy

[73] Assignee: Texeco S.p.A., Turin, Italy

[21] Appl. No.: 714,314

[22] Filed: Mar. 21, 1985

[30] Foreign Application Priority Data

Mar. 22, 1985 [IT] Italy .............................. 67273 A/85

[51] Int. Cl.⁴ .............................................. B08B 7/04
[52] U.S. Cl. ......................................... 134/12; 134/17
[58] Field of Search ................... 134/10, 12, 17, 25.4, 134/40

[56] References Cited

U.S. PATENT DOCUMENTS

| | | | |
|---|---|---|---|
| 3,527,414 | 9/1970 | Schorsch | 134/17 X |
| 3,975,208 | 8/1976 | Tate et al. | 134/12 X |
| 4,091,825 | 5/1978 | Baker | 134/10 X |
| 4,173,493 | 11/1979 | Kallas | 134/12 X |

*Primary Examiner*—Robert Yoncoskie
*Attorney, Agent, or Firm*—Sughrue, Mion, Zinn, Macpeak, and Seas

[57] ABSTRACT

Wastes from insulated electrical cables, including plasticized polymeric material and metal conductors are treated with a solvent to extract selectively the plasticizers in the polymeric material and subsequently the deplasticized polymeric material is subjected to cold crushing. The method is particularly advantageous in connection with the recovery of mixed wastes including plasticized polyvinyl halides and olefin polymers, allowing the selective cold crushing of the polyvinyl halides and their recovery.

10 Claims, 1 Drawing Figure

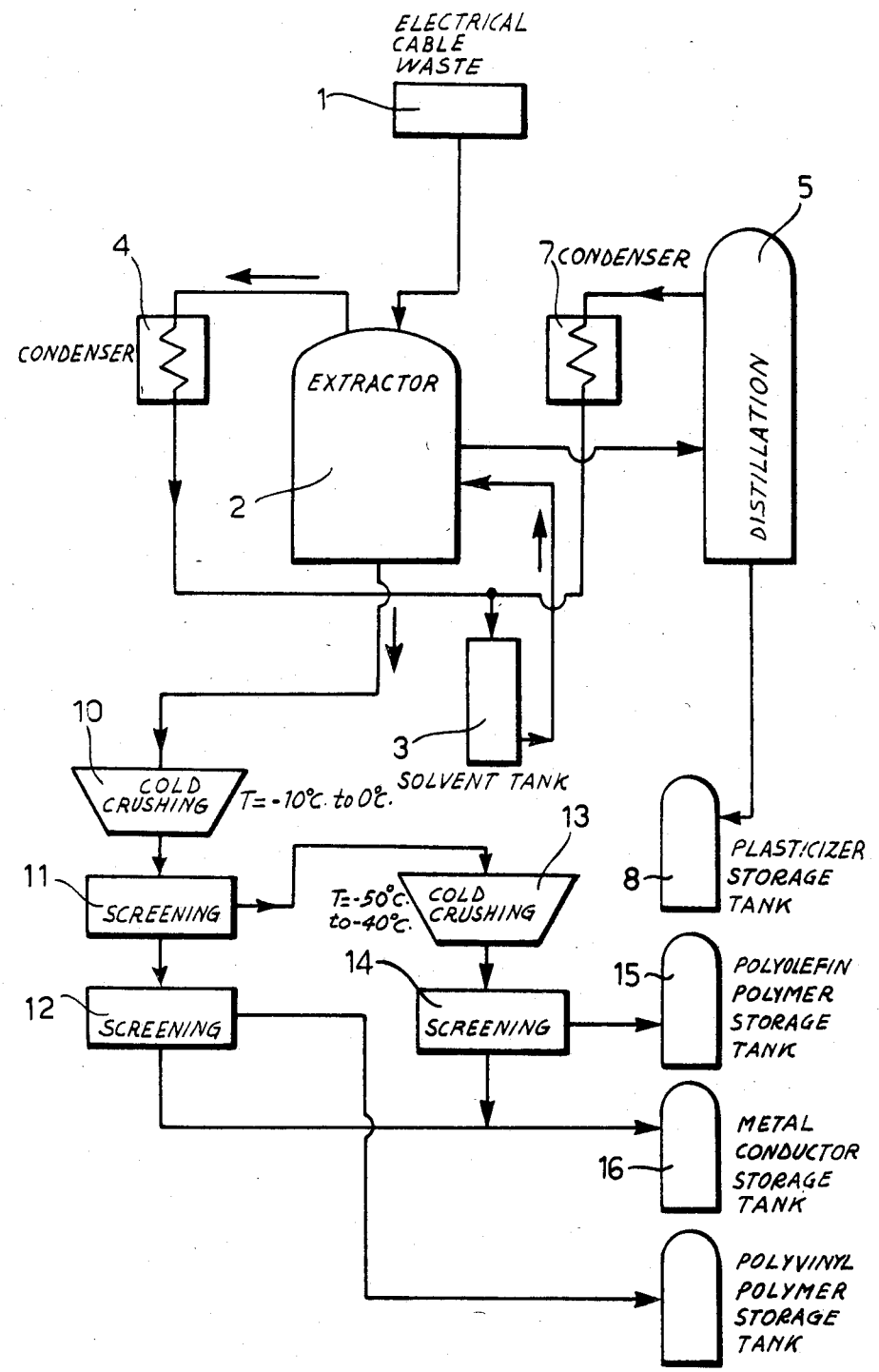

METHOD FOR THE SELECTIVE RECOVERY OF CONSTITUENT MATERIALS FROM INSULATED-ELECTRICAL-CABLE WASTES

DESCRIPTION

The present invention relates to a method for the selective recovery of constituent materials from insulated-electrical-cable wastes, comprising metal conductors and polymeric insulating material constituted at least in part by plasticized polyvinyl halides, by the cold crushing of the polymeric material.

Waste materials from electrical cables typically include metal conductors constituted by copper and aluminium in quantities of about 50-55% by weight of the waste. The polymeric insulating material generally comprises polyvinyl halides, such as polyvinyl chloride and its copolymers, polyvinyl formal and olefin polymers such as polyethylene, polypropylene and polytetrafluoroethylene. Small quantities of polyamide resins, rubbers and acrylic paints may also be present.

The ralative amount and quality of the polymeric insulating material in the wastes depends on the origin of the wastes themselves. For example, polyvinyl chloride is used as the insulator for low-voltage and telephone cables while polyethylene is used in high-frequency and submarine lines. The conductor sheath is often made up of superposed layers of different polymeric materials of which the innermost layer has an insulating function and the outermost layer a protective function. The polyvinyl halides generally include plasticizing agents, particularly dioctyl phthalate (DOP), incorporated in quantities of up to 40% by weight in the polymer matrix to give the material flexibility. Additives such as fillers, pigments and anti-oxidants are also present in the polymer matrix.

In the known art, the constituent materials of wastes from electrical cables are recovered by the removal of the sheath of insulating material from the conductor by various methods which may be divided essentially into: (1) pyrolysis, (2) cold crushing and (3) dissolution in a solvent.

The pyrolysis technique only allows the metal conductor to be recovered and also results in highly polluting fumes from the acidic hydrogen halides generated by the thermal decomposition of the polyvinyl halides.

In the cold-crushing method, the electrical-cable wastes are cooled with the aid of cryogenic fluids to a temperature such as to make the polymeric material brittle and this is then crushed mechanically. Typically, both the polyvinyl polymer and the polyethylene require temperatures of at least −50° C. for the cold crushing, with high refrigeration costs.

The method of recovery by dissolution in solvents requires large volumes of solvents and is consequently very expensive and results in a solution of polymeric material in a solvent from which the polymer is difficult to recover in the pure state without undergoing thermal degradation.

Generally all the methods mentioned above suffer from the disadvantage of allowing only the metal conductor to be recovered either because they result in the destruction of the polymeric material or because they involve intolerable expense in the prior separation of the wastes according to their types of polymeric sheath and are thus not suitable for the recovery of wastes including mixed polymeric materials.

U.S. Pat. No. 3,975,208 describes a process for the selective recovery of polyvinyl sheath materials from mixed electrical-cable wastes by dissolution in a selective solvent for the polyvinyl material. The mass proportion of solvent needed is generally 7-8 times the mass of the material to be treated. The recovery of the vinylic polymer from the solution is carried out by evaporation of the solvent. This operation is of a critical nature since the evaporation temperature must be chosen each time in dependence on the anti-oxidant content of the polyvinyl polymeric material so as to avoid oxidative degradation of the polymeric material.

In order to avoid the disadvantages of the prior art, the present invention provides a cold-crushing method of recovering the polymeric material, which allows the costs connected with the conventional cold-crushing method to be reduced, while at the same time allowing all the component materials of electricalcable wastes to be recovered in a reusable form.

The subject of the present invention is thus a method characterised in that, prior to the cold crushing, it includes the steps of:

(a) contacting the wastes with a selective solvent for the plasticizers in the polymeric material to extract the plasticizers selectively from the polymeric material, (b) separating the solution comprising the extracted plasticizer in the solvent from the solid waste material, The extraction of the plasticizer from the polyvinyl sheath of an electrical cable makes it stiffer and more brittle, raising its crushing temperature from about −45° C. to slightly below 0° C., allowing a substantial reduction in the costs compared with the conventional cold-crushing method. The method according to the invention is also particularly advantageous for the recovery of the constituent materials of mixed wastes including plasticized polyvinyl halides and olefin polymers. In practice, the treatment with the solvent to extract the plasticizer from the polyvinyl halide does not affect the cold crushing temperature of the olefin polymer, which remains at temperatures of about −50° C., making the selective cold crushing of the polyvinyl halides, at temperatures of about −10° C. to 0° C., possible.

According to the invention, the step (a) is carried out at a temperature at which the polymeric material does not soften substantially, typically at a temperature no higher than 60° C.

The solvents used for the selective extraction of the plasticizer are low-boiling, organic compounds which have properties such that, at the extraction temperature, they have no solvent effect upon all the polymeric components of the waste subjected to the recovery process. Preferably low-boiling esters of lower carboxylic $C_1$–$C_4$ acids with $C_1$–$C_3$ alcohols are used as the extraction agents. Ethyl acetate is particularly advantageous for the recovery of mixed wastes including polyvinyl halides and polyethylene since, as well as being a very good solvent for DOP, it has a swelling action on polyvinyl chloride but does not affect polyethylene.

The method according to the invention will now be described with reference to the appended drawing, provided purely by way of non-limiting example, in which the respective plant is illustrated schematically.

The plant illustrated in the drawing relates to the recovery of a mixed waste including plasticized polyvinyl halides and polyolefins. The electrical-cable waste, previously crushed to dimensions of 2-5 cm, is fed from a storage silo 1 to an extractor 2. A flow of a solvent which is selective for plasticizers of the type specified above is fed from a tank 3 to the extractor 2 and brought into contact with the electrical-cable waste in counter-flow. The preferred solvent for the extraction is ethyl acetate, with which the extraction stage is carried out at a temperature of 60° C. at which the polymeric material does not soften substantially. The ratio of the mass flow rate of the solvent to that of the waste fed to the extractor, and the duration of the extraction period, depend on the proportion of plasticized polymeric material in the waste and the proportion of plasticizer in the polymeric material. Typically, the solvent is supplied in quantities of about 5 times the volume of the material to be treated. The duration of the extraction period is typically of the order of about 3 hours. The solvent vapour leaving the extractor 2 is condensed in a condenser 4 and fed to the pure-solvent tank 3. The solution of the plasticizer in the solvent is fed to a distillation plant 5 for the recovery of the solvent and the plasticizer. With the use of a low-boiling solvent, the plasticizers constitute the tails from the distillation column 5 and are conveyed to a storage tank 8 since they constitute a product which can be recycled in industry. The solvent vapour is extracted from the head of the distillation column, condensed in a condenser 7 and then fed to the pure-condensed solvent tank. The plasticizer recovered is a commercially-valuable product which may be reused not only in mixtures with polyvinyl polymers but also with polymers such as cellulose nitrate and acetate and polystyrene. Its recovery is thus a further advantage of the method of the present invention. Before the outlet from the extractor, the solvent residue is removed from the waste mass by evaporation. Furthermore, if the extraction temperature is higher than the ambient temperature, the mass is cooled to ambient temperature after which the waste is fed to a cold-crushing stage 10. The cold crushing is carried out at a temperature of from −10° to 0° C. to obtain selective crushing solely of the polyvinyl chloride which is enbrittled by the extraction of the plasticizer. At this temperature, in fact, the polyethylene in the waste still has its inherent characteristics of plasticity and is not crushed. At the outlet from the cold-crushing stage 10, the waste is then fed in series to a screening stage 11 in which the waste portion constituted by metal conductors with polyethylene sheaths is separated from the crushed polyvinyl chloride and from the metal conductor freed from its sheath. The metal conductor and the polyvinyl chloride are then fed to a separation stage 12 in which they are separated by means of their different densities and stored in respective silos 16 and 17. That portion of the electrical cables covered with polyethylene sheaths superated in screening stage 11 may be fed to a second cold-crushing stage 13 which is operated at a temperature of from −50° to −40° C. to crush the polyethylene. The crushed material is then fed to a separation stage 14 in which the metal conductor is separated and then stored in the silo 16. The polyethylene leaving the separation stage 14 is stored in a silo 15.

It should be noted that, in the selective cold-crushing stage 10, both the conductors sheathed wholly in polyvinyl chloride and those having outer sheaths of polyethylene or rubber and inner insulating sheaths of polyvinyl chloride are freed from their coatings. This fact, together with the relatively high proportion of polyvinyl chloride in the customary electrical-cable wastes means that most of the metal conductor present in the wastes is already freed from its polymeric sheath in the cold-crushing stage 10. Consequently, the possibility of providing a second cold-crushing stage at a lower temperature is a choice which depends on the characteristics of the waste treated and the quantity of metal conductor in the polyethylene fraction. In the alternative case in which it is not remunerative to provide the second cold crushing stage 13, it is possible to feed those conductors with polyethylene sheaths separated in the screening stage 11 directly to a metallurgical refining plant for the recovery of the metal conductor. This type of recovery is also made possible by the lack of chlorine in the polyethylene polymer with the resulting absence of pollutant fumes.

The polyvinyl chloride recovered by the method of the present invention has a residual plasticizer content of no more than 5% by weight and is a highly-valued commercial product which may be recycled to a very wide market. Furthermore, the residual polyethylene can be recycled as an alternative fuel in that it is free from chlorine.

Naturally the principle of the invention remaining the same, the embodiments and details of realisation may be varied widely with respect to that described and illustrated purely by way of non-limiting example without departing from the scope of the present invention.

What is claimed is:

1. Method for the selective recovery of constituent materials from insulated-electrical-cable wastes comprising metal conductors sheathed in polymeric insulating material including a plasticized polyvinyl halide, said method including the step of cold crushing said wastes to break up the polyvinyl halide and separating the crushed polyvinyl halide from said metal conductors, and wherein the improvement consists in the method further including, prior to said cold-crushing step, the steps of:
    (a) contacting said wastes with a selective solvent for the plasticizers in said plasticized polyvinyl halide to dissolve said plasticizers in said solvent, leaving a residual solid waste;
    (b) separating said plasticizers dissolved in said solvent from said residual solid waste.

2. Method as in claim 1 for the selective recovery of said constituent waste materials from insulated electrical cables in which said polymeric insulating material further includes a polyolefin, wherein said cold-crushing step is carried out at a temperature such as to cause the selective crushing solely of said polyvinyl halide.

3. Method as in claim 1, wherein said step (a) is carried out at a temperature at which said polymeric insulating material does not undergo substantial softening.

4. Method as in claim 1, wherein said step (a) is carried out at a temperature no higher than 60° C.

5. Method as in claim 1, wherein said solvent is selected from esters of aliphatic carboxylic $C_1$–$C_4$ acids with $C_1$–$C_3$ alcohols.

6. Method as in claim 5, wherein said solvent is ethyl acetate.

7. Method as in claim 1, wherein said cold-crushing step is carried out a temperature of from −10° to 0° C.

8. Method as in claim 2, wherein, after said cold-crushing step, said method includes a further step of:
    (d) screening the solid waste from said cold-crushing step to separate the crushed polyvinyl halide and metal conductors freed from polymeric insulating material from metal conductors sheathed in polyolefin insulating material.

9. Method as in claim 8, wherein it further includes the step of:

(e) supplying said conductors sheathed in polyolefin insulating material separated in step (d) to a cold-crushing step at a temperature below $-40°$ C. to crush said polyolefin.

10. Method as in claim 1, wherein said plasticizers dissolved in said solvent are fed to a distillation stage for the recovery of said solvent and said plasticizers.

* * * * *

UNITED STATES PATENT AND TRADEMARK OFFICE
CERTIFICATE OF CORRECTION

PATENT NO. : 4,596,603

DATED : June 24, 1986

INVENTOR(S) : Roberto PELLEGRIN and Alessandro GHISOTTI

It is certified that error appears in the above-identified patent and that said Letters Patent is hereby corrected as shown below:

On the Title Page, Item [30] should read:

Foreign Priority Data

March 22, 1984    Italy    67273-A/84

Signed and Sealed this

Twentieth Day of October, 1987

Attest:

DONALD J. QUIGG

*Attesting Officer*    *Commissioner of Patents and Trademarks*